United States Patent Office 3,207,699
Patented Sept. 21, 1965

3,207,699
TRIMETHYLSILANE TREATMENT OF DRY CALCINED SILICA-ALUMINA
William A. Harding, Morton, and Harold Shalit, Drexel Hill, Pa., assignors to Air Products and Chemicals, Inc., a corporation of Delaware
No Drawing. Filed May 4, 1961, Ser. No. 107,645
2 Claims. (Cl. 252—430)

This invention concerns porous catalysts and methods of preparation thereof.

Heretofore sorptive solids such as damp silica gel have been treated with dimethyldichlorosilane, which reacted with the moisture film to establish a siliconized, water repellent surface and to improve the tendencies for oil films to form on and in the siliconized silica gel. Heretofore, there have been proposals for conducting chemical reactions in the presence of a catalyst consisting of the combination of a sorptive solid and a gaseous compound of silicon as an accelerator such as silicon tetrachloride.

In accordance with the present invention, an improved acidic catalyst is prepared by chemically attaching a restricted quantity of alkylsilyl groups to the internal surface of an acidic refractory oxide of one or more metals, at an elevated temperature, cooling the treated acidic refractory oxide in an atmosphere containing no oxygen, whereby the catalytic properties of the acidic catalyst are significantly modified without completely destroying the acidity of the catalyst.

The invention is further clarified by reference to a plurality of examples.

EXAMPLE I

An apparatus permitted a gas stream to flow downwardly through several layers of beds of granular particles. All beds were heated externally by a furnace. The uppermost bed and the lowermost bed each consisted of inert granules of fused silica, adapted to heat the gas stream to the temperature of the furnace. The sorptive metal oxide being treated was a 50 ml. bed of granules positioned between the upper and lower beds of inert granules.

After the gas stream flowed downwardly through the three beds, it flowed through three cooling zones to a gas collection container. The gaseous effluent from the furnace was cooled by glass surfaces of three heat exchangers cooled respectively by water, ice, and solid carbon dioxide. Only gases not readily condensed at $-80°$ C. accumulated in the gas collection flasks.

The acidities of refractory oxides have been measured by several procedures. One of the best known ratings for such acidity is the Cat-A activity test described by J. Alexander and H. G. Shimp, National Petroleum News, Aug. 2, 1944, at pages R537 and R538, and Proc. Am. Petroleum Inst. III, 27, 51 (1947). Certain sorptive metal oxides were identified as synthetic silica alumina cracking catalysts having cracking activities expressed as 16, 38, 43 and 65 Cat-A activities, and designated Solids A, B, C and D respectively. Each of said solids A, B, C and D contained 87.5% silica and 12.5% alumina. Solid E was prepared by treating Solid B with aqueous sodium hydroxide and calcining for 2 hours at 760° C., whereby its Cat-A activity was reduced from 38 to 22.9.

Certain silica beads have a relatively large macropore volume by reason of the inclusion of powder in the gelatinous precursor. Such beads having a surface area of 330 m.$^2$/g. were designated Solid F and those having a surface area of 187 m.$^2$/g. were designated Solid G. Fused quartz particles were designated Solid H.

Solid B was heated to 510° C. and treated with trimethylsilane gas ($Me_3SiH$) at each of three space rates. The unreacted $Me_3SiH$, if any, was caught in the cold traps, and the extent of decomposition was indicated by the volume of uncondensable gas collected. Data concerning the treatment of Solid B with $Me_3SiH$ are shown in Table 1.

Table 1.—*Effect of charge rate on decomposition of* $Me_3SiH$ $Me_3SiH$ passed over Solid B at 510° C.

| Charge rate, Mmols/min. | Minutes | Gas formed, l. |
|---|---|---|
| 1.3 | 2 | 0.05 |
| 1.3 | 4 | 0.10 |
| 1.3 | 8 | 0.22 |
| 1.3 | 16 | 0.51 |
| 1.3 | 32 | 0.85 |
| 2.7 | 2 | 0.10 |
| 2.7 | 4 | 0.26 |
| 2.7 | 8 | 0.58 |
| 2.7 | 10 | 0.70 |
| 2.7 | 12 | 0.75 |
| 2.7 | 16 | 0.80 |
| 2.7 | 20 | 0.84 |
| 4.7 | 2 | 0.25 |
| 4.7 | 4 | 0.52 |
| 4.7 | 6 | 0.75 |
| 4.7 | 8 | 0.85 |
| 4.7 | 10 | 0.90 |
| 4.7 | 12 | 0.92 |

There appeared to be good correlation between the charge rate and the initial slope of the curve of gas formation as indicated in Table 2.

Table 2

| Charge rate, Mmols/min. | Gas formation rate curve slope ratio | | Charge rate ratio |
|---|---|---|---|
| 1.3 | 4.11 | 1.00 | 1.00 |
| 2.7 | 8.40 | 2.04 | 2.08 |
| 4.7 | 15.00 | 3.65 | 3.61 |

The gas formation rate ratios are substantially the same as the charge rate ratios. Such correlation of gas formation rate with the charge rate indicated that during the initial stage of the treatment, the trimethylsilane reacted with the catalyst, bonding the methylsilyl groups to the solid and evolving gases such as hydrogen and methane. Moreover, no silicon-containing product was detected in the effluent from the reaction chamber during the initial phase of the treatment. From the weight balance, it appeared that the missing elements corresponded substantially to missing $—Si(CH_3)_3$ groups, although there was some side-reaction decomposition to groups such as $(—Si(CH_3)_2—CH_2(CH_3)_2Si—)$ involving an Si:C:H ratio of 1:2.50:7. Moreover, the concentration of $CH_4$ in the gas collection flasks provided supplemental evidence of the extent of decomposition of the $—Si(CH_3)_3$ groups. The analysis of the silane complexed with the catalyst, as determined by material balance, is indicated in Table 3.

Table 3

| Charge rate Mmols/min. | Atomic ratios in organosilane unidentified in material balance (conveniently designated as silane complexed with catalyst) | | | |
|---|---|---|---|---|
| | Si | C | H | H/C ratio |
| 1.3 | 1.00 | 2.58 | 7.29 | 2.83 |
| 2.7 | 1.00 | 2.55 | 7.39 | 2.90 |
| 4.7 | 1.00 | 2.62 | 7.38 | 2.82 |

The range from about 0.1 to about 10 mols of silane compound per liter of catalyst is designated as the operable range for the initial reaction with fresh catalyst. The more complicated competition among the several reactions occurs after such initial reaction, and can be readily detected because of the recovery of silicon-containing compounds in the effluent from the treatment zone after such initial reaction is accomplished.

The catalyst resulting from the treatment of Solid B (87.5% silica, 12.5 alumina, Cat-A activity 38) at 510° C. with about 1 mol of trimethylsilane per liter of silica alumina (for example, charging 4.7 millimols through the described apparatus for about 12 minutes or 2.7 millimols for about 20 minutes or 2.3 millimols per minute for about 42 minutes) has catalytic properties which are distinguishable from the fresh Solid B. For example, the catalyst impregnated with trimethylsilyl groups has remarkable effectiveness as a catalyst for the redistribution reaction of trimethylsilane, whereby trimethylsilane is converted into a mixture of methylsilane, dimethylsilane, trimethylsilane, and tetramethylsilane.

Samples of Solid B were dried at 510° C. and then treated with trimethylsilane at a charge rate of 2.7 millimols per liter for 20 minutes at a series of temperatures. As indicated in Table 4 the treatment at elevated temperatures tends to bring about increased decomposition of the trimethylsilyl group whereby the complex contains fewer methyl groups per silicon atom and whereby more methane gas is formed from the treatment.

*Table 4*

| Temp., °C. | Atomic ratios in organosilane unidentified in material balance and presumably deposited in Solid B | | | |
|---|---|---|---|---|
| | Si | C | H | H/C |
| 92 | 1.00 | 2.97 | 8.94 | 3.01 |
| 245 | 1.00 | 2.92 | 8.58 | 2.94 |
| 510 | 1.00 | 2.55 | 7.39 | 2.90 |

By a series of tests, a basis is established for setting 100° C. as the minimum temperature and setting 600° C. as the peak temperature for the preparation of the catalyst containing the trimethylsilyl groups.

The silica alumina having Cat-A activity of 38 and designated Solid B was dried for one hour at 510° C. and then treated with trimethylsilane at 277° C. at a rate of 1.1 millimols per minute during the initial period of organosilane deposition and during the subsequent period of disproportionation. Inasmuch as 61.7% of the trimethylsilane underwent redistribution at a temperature as low as 277° C., this sample of catalyst was deemed to be particularly active.

Treatment of silica alumina granules having a Cat-A activity of 65 (designated Solid D) brought about the redistribution of 59.1% of the trimethylsilane passed at the standard conditions subsequent to the deposition of trimethylsilane. However, when the reaction was conducted at 204° C. instead of 510° C., only 26.9% of the trimethylsilane underwent the redistribution reaction. Under conditions which differed only in that the drying of the 65 Cat-A activity silica alumina (Solid D) was conducted at 204° C. instead of 510° C., only 4.9% of the trimethylsilane underwent the redistribution reaction at 204° C. By a series of tests, a basis was established for the requirement of drying the acidic sorptive solid at conditions at least as severe as one hour at a temperature of 400° C. prior to the initial treatment with the silane to deposit silyl groups at some of the most acidic sites. If the drying of the sorptive acidic solid is insufficient, the moisture retained at the acidic sites may react with the organosilane instead of the organosilane chemically combining with the sorbtive acidic solid.

Sorptive silica beads such as described as F and G have no significant acidity but a relatively high surface area. Trimethylsilane was passed for 18 minutes at a rate of 2.7 mmols/min. over a 50 ml. bed of silica beads F maintained at 510° C. The gas evolution was noted as shown in Table 5.

*Table 5*

| Minutes: | Liters of gas |
|---|---|
| 4 | 0.27 |
| 8 | 0.55 |
| 10 | 0.68 |
| 12 | 0.77 |
| 14 | 0.84 |
| 16 | 0.88 |
| 18 | 0.91 |

In several similar runs the $H_2/CH_4$ ratio was significantly higher than it had been in the treatment of cracking catalysts and the data from the initial treatment of silica beads F was as shown in Table 6.

*Table 6*

| Molar ratios of complex on solid | | | Gas formed, Mmols | | |
|---|---|---|---|---|---|
| Si | C | H | $H_2$ | $CH_4$ | $H_2/CH_4$ |
| 1.00 | 2.77 | 7.98 | 25.7 | 8.4 | 3.06 |
| 1.00 | 2.84 | 8.07 | 26.7 | 6.7 | 3.98 |
| 1.00 | 2.85 | 8.09 | 21.9 | 4.8 | 4.57 |
| 1.00 | 2.77 | 8.18 | 25.4 | 5.6 | 4.54 |

The solid prepared by treating sorptive silica beads F with trimethylsilane was not a catalyst in accordance with the present invention because it lacked the significant cracking activity necessary for the catalysts of the present invention both before and after treatment with trimethylsilane.

Sorptive silica beads G having a surface area of 187 m.²/g. were treated with trimethylsilane at a rate of 2.7 mmols/min. for 14 minutes at 510° C., during which the cumulative gas formation was as shown in Table 7.

*Table 7*

| Minutes: | Liters of gas |
|---|---|
| 4 | 0.23 |
| 8 | 0.49 |
| 10 | 0.57 |
| 12 | 0.60 |
| 14 | 0.62 |

The molar ratios for the complex added to the solid was 1.00 Si:2.77 C:8.23 H and 13.9 mmols of $H_2$ formed during the formation of 7.4 mmols of $CH_4$, providing a ratio of 1.88. The solid prepared by treating silica beads G with trimethylsilane was not a catalyst in accordance with the present invention because it lacked the significant cracking activity necessary for catalysts of the present invention both before and after treatment with trimethylsilane.

Fused quartz particles (Solid H) were dried at 510° C. and then treated with a trimethylsilane, and the thus treated solid was evaluated as a catalyst for the redistribution reaction of trimethylsilane at 2.7 mmols per minute at 510° C. Most of the trimethylsilane was recovered unchanged, the extent of the redistribution (sometimes called disproportionation) reaction was only 4.2%. Silica beads of larger surface area such as Solids F and G were also relatively poor catalysts. Solid G having a surface area of 187 m.²/g., after initial treatment with trimethylsilane, had only enough catalytic artivity to promote 8.6% disproportionation (or redistribution) of additional trimethylsilane. Solid F having a surface area of 330 m.²/g., after initial treatment with trimethylsilane, had only enough catalytic activity to promote 14.8% disproportionation of trimethylsilane when the stream of trimethylsilane was continued after the initial deposition of trimethylsilyl groups had been completed at the standard conditions (2.7 millimols per minute at 510° C. after predrying at 510° C.).

The activities of the several trimethylsilylated solids for the disproportionation of trimethylsilane are tabulated in Table 8.

*Table 8.—Extent of redistribution reaction of trimethylsilane*

CONTROLS OUTSIDE SCOPE OF PRESENT INVENTION

| Solid | Cat-A activity | Drying, °C. | Conditions of reaction | | Percent reacted |
|---|---|---|---|---|---|
| | | | °C. | Mmols/min. | |
| F | ND | 510 | 510 | 2.7 | 14.8 |
| G | ND | 510 | 510 | 2.7 | 8.6 |
| H | ND | 510 | 510 | 2.7 | 4.2 |
| D | 65 | 204 | 204 | 2.5 | 4.9 |

EXAMPLES OF THE PRESENT INVENTION

| B | 38 | 510 | 92 | 2.7 | 11.9 |
|---|---|---|---|---|---|
| B | 38 | 510 | 245 | 2.7 | 23.8 |
| B | 38 | 510 | 277 | 1.1 | 61.7 |
| B | 38 | 510 | 510 | 1.3 | 59.3 |
| B | 38 | 510 | 510 | 2.7 | 56.7 |
| B | 38 | 510 | 510 | 4.7 | 53.6 |
| D | 65 | 510 | 204 | 2.6 | 26.9 |
| D | 65 | 510 | 510 | 2.4 | 59.1 |

EXAMPLE II

Comparisons are made among catalysts containing the trimethylsilyl group prepared from Solids A, B and C, in the apparatus described in connection with Example I. Each catalyst was treated with trimethylsilane for 20 minutes at a charge rate of 2.7 millimols per minute at 510° C. The higher the cracking activity of the catalyst, the greater the decomposition of the trimethylsilane, and the lower the hydrogen to carbon ratio in the methylsilyl component added to the catalyst. Data relating to the molar ratios of the elements in the methylsilyl component added to the catalyst are set forth in Table 9.

*Table 9*

| Initial solid | Catalyst acidity | Molar ratios of component added to catalyst | | | |
|---|---|---|---|---|---|
| | | Si | C | H | H/C |
| A | 16 | 1.00 | 2.50 | 7.33 | 2.93 |
| B | 38 | 1.00 | 2.55 | 7.39 | 2.90 |
| C | 43 | 1.00 | 2.73 | 7.70 | 2.82 |

The data of Table 9 indicate that the acidity of the starting material may sometimes have an effect on the product obtained by treatment with trimethylsilane.

EXAMPLE III

Solid E which had a Cat-A activity of 23 and which had been prepared by impregnating Solid B with excess aqueous sodium hydroxide solution and thereafter calcining for 2 hours at 1400° F. was dried at 510° C. and then treated with trimethylsilane at 510° C. at the rate of 2.7 millimols per minute for 10 minutes. The collected gas consisted essentially of 9.6 millimols of hydrogen and 7.3 millimols of methane providing a hydrogen to methane ratio of 1.32:1. In the corresponding treatment of Solid B, for a period of 20 minutes, 17.2 millimols of hydrogen were formed together with 16.2 millimols of methane providing a hydrogen to methane ratio of 1.06:1. The catalyst complex molar ratio for the sodium oxide deactivated Solid E was 1:2.66:7.79 for the silicon:carbon:hydrogen ratio instead of 1.00:2.55:7.39 ratio for the complex derived from Solid B.

The catalyst prepared by chemically combining trimethylsilyl groups with a sodium oxide deactivated Solid E had useful properties as a catalyst for the disproportionation of methylsilanes.

EXAMPLE IV

Sorptive alumina granules were prepared following the procedure of Cornelius, 2,809,170, starting with high purity beta alumina trihydrate, and obtaining eta alumina granules after calcination. These eta alumina granules were rehumidified at about 20° C. to contain sorbed moisture, and designated Solid J. These Solid J granules were treated with trimethylsilane in the apparatus described in Example I. Initially the trimethylsilane was passed at the rate of 2.7 mmols/minute for 17 minutes at 510° C. over 30.8 g. (50 ml.) of alumina pellets. The thus treated catalyst was employed as a catalyst for the redistribution reaction of trimethylsilane and eventually was regenerated by passage of air over the catalyst. The trimethylsilane treatment, use and regeneration were repeated several times. After the fifth regeneration, the catalyst contained 13% silica and 87% alumina, and had a Cat-A activity of about 25. The data relating to collection of gas is set forth in Table 10.

*Table 10*

| mM | Fresh | Liters of gas | | | | |
|---|---|---|---|---|---|---|
| | | I | II | III | IV | V |
| 4 | 0.3 | 0.3 | 0.3 | 0.3 | 0.3 | 0.3 |
| 8 | 0.75 | 0.59 | 0.50 | 0.46 | 0.43 | 0.52 |
| 10 | 0.96 | 0.65 | 0.53 | 0.48 | 0.45 | 0.55 |
| 12 | 1.09 | 0.68 | 0.55 | ---- | ---- | ---- |
| 14 | 1.15 | 0.70 | 0.56 | ---- | ---- | ---- |
| 16 | 1.19 | ---- | ---- | ---- | ---- | ---- |
| 18 | 1.20 | ---- | ---- | ---- | ---- | ---- |

The data relating to the series are shown in Table 11.

*Table 11.—Trimethylsilane treatment of eta alumina*

| | Molar ratio of complex on solid | | | Mmols gas formed | |
|---|---|---|---|---|---|
| | Si | C | H | $H_2$ | $CH_4$ |
| Fresh | 1.00 | 2.31 | 6.14 | 19.4 | 24.5 |
| I | 1.00 | 2.61 | 7.43 | 12.9 | 12.4 |
| II | 1.00 | 2.68 | 7.68 | 10.0 | 9.0 |
| III | 1.00 | 2.56 | 7.11 | 10.1 | 9.2 |
| IV | 1.00 | 2.63 | 7.63 | 8.6 | 8.3 |
| V | 1.00 | 2.68 | 8.00 | 8.0 | 7.3 |

The catalyst after the fifth regeneration had 13% silica, corresponding to 4.6 g. of $SiO_2$, corresponding to 76.7 mmols of trimethylsilane, which is the same order of magnitude as the 69 mmols of hydrogen formed during the six treatments.

The oxide must be dried at a temperature greater than 400° C. prior to the treatment with the organosilane.

After the inorganic oxide has been treated with from 0.1 to 10 mols of organosilane per liter of inorganic oxide and cooled in an atmosphere containing no oxygen to prepare the catalyst of the present invention, the thus prepared catalyst may be utilized for any of a variety of chemical reactions. When used as a catalyst for the disproportionation of trimethylsilane, the results reported in Table 12 were noted:

*Table 12*

| Precursor solid | Cat-A activity | Pretreatment, °C. | Disproportionate conditions | | Percent disp. |
|---|---|---|---|---|---|
| | | | °C. | Mmols/min. | |
| J (eta $Al_2O_3$) | 90 | 510 | 510 | 2.7 | 10.2 |
| J (5th reg) (13% $SiO_2$) | 25 | 510 | 510 | 2.7 | 28.9 |
| A | 16 | 510 | 510 | 2.7 | 24.0 |
| C | 43 | 510 | 510 | 2.7 | 56.2 |

The invention claimed is:

1. The method of preparing a silica alumina cracking catalyst having modified acidic activity which consists essentially of the steps of: preparing silica alumina granules having cracking activity; drying said granules at a temperature greater than 400° C.; treating the hot dried granules with the vapors of trimethylsilane, whereby hydrogen is evolved and trimethylsilyl groups are bonded to the granules; and cooling the thus treated granules in an atmosphere containing no oxygen, whereby a catalyst is prepared comprising trimethylsilyl groups bonded to silica alumina.

2. The method of claim 1 in which the silica alumina granules are prepared to have a cracking activity of at least 15 Cat-A activity; in which the granules are dried at a temperature of at least 400° C. for at least one hour, said drying being at a temperature low enough to preserve the cracking activity of at least 15 Cat-A; in which the treating of the dried granules with trimethylsilane is at a temperature within the range from 100° C. to 600° C.; and in which the quantity of trimethylsilane is within the range from 0.1 to 10 mols per liter of granules.

References Cited by the Examiner

UNITED STATES PATENTS

| | | | |
|---|---|---|---|
| 2,486,162 | 10/49 | Hyde | 260—448.2 |
| 2,525,072 | 10/50 | Kearby | 117—106 |
| 2,722,504 | 11/55 | Fleck | 260—448.2 X |
| 2,851,473 | 9/58 | Wagner et al. | 260—448.2 |
| 3,116,161 | 12/63 | Purnell | 260—448.2 |

TOBIAS E. LEVOW, *Primary Examiner.*

JULIUS GREENWALD, SAMUEL H. BLECH,
*Examiners.*